US010747268B2

(12) United States Patent
Kemppinen

(10) Patent No.: US 10,747,268 B2
(45) Date of Patent: *Aug. 18, 2020

(54) DISPLAY SUSPENSION

(71) Applicant: Nokia Technologies Oy, Espoo (FI)

(72) Inventor: Pasi Kemppinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,199

(22) Filed: Nov. 9, 2018

(65) Prior Publication Data

US 2019/0086958 A1  Mar. 21, 2019

Related U.S. Application Data

(63) Continuation of application No. 14/406,521, filed as application No. PCT/IB2012/053038 on Jun. 15, 2012, now Pat. No. 10,168,737.

(51) Int. Cl.
*G06F 1/16* (2006.01)
*H04M 1/02* (2006.01)
*H04M 1/23* (2006.01)

(52) U.S. Cl.
CPC .......... *G06F 1/1633* (2013.01); *G06F 1/1626* (2013.01); *G06F 1/1643* (2013.01); *H04M 1/0266* (2013.01); *H04M 1/0206* (2013.01); *H04M 1/23* (2013.01); *H04M 2250/22* (2013.01)

(58) Field of Classification Search
CPC .. G06F 1/1626; G06F 1/1643; H04M 1/0266; H04M 1/0206; H04M 1/23; H04M 2250/22

See application file for complete search history.

(56) References Cited

U.S. PATENT DOCUMENTS

| 4,950,072 | A | 8/1990 | Honda |
| 6,911,901 | B2 | 6/2005 | Bown |
| 7,151,837 | B2 | 12/2006 | Bank et al. |
| 7,463,734 | B2 | 12/2008 | Tolbert et al. |
| 7,765,970 | B2 | 8/2010 | Sammons |
| 8,934,228 | B2 | 1/2015 | Franklin et al. |
| 2002/0075135 | A1 | 6/2002 | Bown |
| 2002/0149571 | A1 | 10/2002 | Roberts |
| 2003/0059069 | A1 | 3/2003 | Bank et al. |
| 2006/0028596 | A1 | 2/2006 | Leung et al. |
| 2006/0171107 | A1 | 8/2006 | Yamamoto et al. |
| 2006/0192771 | A1 | 8/2006 | Rosenberg et al. |

(Continued)

FOREIGN PATENT DOCUMENTS

| EP | 2385683 | | 11/2011 |
| EP | 2390765 | A1 | 11/2011 |

(Continued)

*Primary Examiner* — Abhishek M Rathod
(74) *Attorney, Agent, or Firm* — Harrington & Smith

(57) ABSTRACT

An apparatus includes a body portion and a display assembly coupled to the body portion, the display assembly comprising at least one of a display and a display window. The body portion includes at least one opening defined by a surface extending underneath a portion of the display assembly and being configured to suspend the display assembly. A portion of the body portion is configured to flex and allow movement of the display assembly upon application of a force from at least one actuator to the display assembly. The body portion provides a casing configured to surround electrical components of the apparatus.

20 Claims, 9 Drawing Sheets

(56) References Cited

U.S. PATENT DOCUMENTS

| | | |
|---|---|---|
| 2007/0229475 A1 | 10/2007 | Gettemy et al. |
| 2010/0117809 A1 | 5/2010 | Dai et al. |
| 2010/0328230 A1 | 12/2010 | Faubert et al. |
| 2011/0036876 A1 | 2/2011 | Fatholiahi |
| 2011/0244930 A1 | 10/2011 | Kong et al. |
| 2012/0008266 A1 | 1/2012 | Nomura |
| 2012/0039057 A1 | 2/2012 | Paleczny et al. |
| 2012/0074005 A1 | 3/2012 | Johnson et al. |
| 2012/0105354 A1 | 5/2012 | Narasimhan |
| 2012/0149437 A1 | 6/2012 | Zurek et al. |
| 2012/0307423 A1 | 6/2012 | Boh et al. |
| 2012/0275086 A1 | 11/2012 | Pasquero et al. |

FOREIGN PATENT DOCUMENTS

| | | |
|---|---|---|
| WO | 2003/049493 A1 | 6/2003 |
| WO | 2010/085575 A1 | 7/2010 |
| WO | 2011/054384 A1 | 5/2011 |
| WO | 2012/025783 A1 | 3/2012 |

DISPLAY SUSPENSION

CROSS REFERENCE TO RELATED APPLICATION

This patent application is a continuation application of copending U.S. patent application Ser. No. 14/406,521, filed on Dec. 8, 2014, which is a national stage entry of PCT/IB2012/053038, filed on Jun. 15, 2012, the disclosures of which are incorporated by reference herein in their entireties.

TECHNICAL FIELD

The present application relates to display and speaker suspension apparatus. In some embodiments the apparatus relates to display and speaker suspension apparatus for mobile apparatus.

BACKGROUND

Some portable electronic devices comprise transducers such as loudspeakers and/or earpieces which are required to be small in size. Transducers are important components in electronic devices such as mobile phones for the purposes of playing back music or having a telephone conversation. The quality and loudness of a transducer in an electronic device are important especially where a user listens to sounds generated by an electronic device at a distance from the electronic device.

Furthermore many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

SUMMARY OF SOME EMBODIMENTS

There is provided according to a first aspect of the application an apparatus comprising: a body portion; and a display assembly coupled to the body portion, wherein the body portion is configured to suspend the display assembly.

The apparatus may further comprise an internal static portion coupled to the body portion.

The internal static portion may comprise at least one of: a battery; a printed wiring board; a printed circuit board; and an internal chassis.

The apparatus may further comprise at least one actuator coupled to the internal static portion and the display assembly, wherein the actuator is configured to apply a force to the display assembly relative to the internal static portion to enable the display assembly to move relative to the internal static portion.

The apparatus may further comprise at least one actuator coupling configured to transmit the force from the at least one actuator to the display assembly.

The apparatus may comprise a display coupled to the internal static portion and located separate from and underneath the display assembly.

The apparatus may comprise a touch sensor coupled to the internal static portion and located separate from and underneath the display assembly.

The display assembly may comprise at least one of: a display window; a display module; and a display component.

The apparatus may comprise a touch sensor coupled to the display assembly, wherein the body portion is configured to suspend the touch sensor.

The body portion may comprise a thinned wall section configured to flex relative to the remainder of the body portion, and wherein the thinned wall section is configured to suspend the display assembly.

The thinned wall section may comprise at least one of: a thinned wall section adjacent the display assembly; a thinned wall section underneath and supporting the display assembly; a curved profile body edge thinned wall section; and an end wall body thinned wall section.

The body portion may comprise a rigid material portion and a flexible material portion, wherein the flexible material portion is configured to flex relative to the rigid material portion, and wherein the flexible material portion is configured to suspend the display assembly.

The flexible portion may comprise at least one of: a flexible bellow material coupling the display assembly and the rigid material portion; an elastomer plug material coupling the display assembly and the rigid material portion; and an elastomer lip material coupling the display assembly and the rigid material portion.

The body portion may be configured to suspend the display assembly such that the display assembly is configured to move in a direction substantially perpendicular to the display assembly.

The body portion may be an apparatus cover.

According to a second aspect there is provided a method comprising: providing a body portion; and coupling a display assembly to the body portion; and suspending the display portion with the body portion.

The method may further comprise coupling an internal static portion to the body portion.

The internal static portion may comprise at least one of: a battery; a printed wiring board; a printed circuit board; and an internal chassis.

The method may further comprising coupling at least one actuator to the internal static portion and the display assembly, wherein the actuator is configured to apply a force to the display assembly relative to the internal static portion to enable the display assembly to move relative to the internal static portion.

The method may further comprise coupling the at least one actuator to transmit the force from the at least one actuator to the display assembly.

The method may comprise coupling a display to the internal static portion, wherein the display is located separate from and underneath the display assembly.

The method may comprise coupling a touch sensor to the internal static portion and located separate from and underneath the display assembly.

The display assembly may comprise at least one of: a display window; a display module; and a display component.

The method may comprise: coupling a touch sensor to the display assembly; and suspending the touch sensor with the body portion.

The method may comprise flexing a thinned wall section of the body portion relative to the remainder of the body portion, wherein the thinned wall section suspends the display assembly.

The body portion may be an apparatus cover.

According to a third aspect there is provided a transducer comprising: means for supporting; and means for windowing a display component coupled to the means for supporting, wherein the means for supporting is configured to suspend the means for windowing the display.

The apparatus may further comprise internal static means coupled to the cover portion.

The internal static means may comprise at least one of: a battery; a printed wiring board; a printed circuit board; and an internal chassis.

The apparatus may further comprise means for actuating coupled to the internal static means and the means for windowing the display, wherein the means for actuating may be configured to apply a force to the means for windowing a display relative to the internal static means to enable the means for windowing a display to move relative to the internal static means.

The apparatus may further comprise at least one means for coupling for transmitting the force from the at least one means for actuating to the means for windowing a display.

The apparatus may comprise a display means coupled to the internal static means and located separate from and underneath the means for windowing a display.

The apparatus may comprise means for sensing touch coupled to the internal static means and located separate from and underneath the means for windowing a display.

The apparatus may comprise a display means coupled to the means for windowing a display, wherein the means for supporting may be configured to suspend the display.

The apparatus may comprise means for sensing touch coupled to the means for windowing a display, wherein the means for supporting may be configured to suspend the means for sensing touch.

The means for supporting may comprise a thinned wall section configured to flex relative to the remainder of the means for supporting, and wherein the thinned wall section may be configured to suspend the means for windowing a display.

The means for supporting may comprise a rigid material portion and a flexible material portion, wherein the flexible material portion may be configured to flex relative to the rigid material portion, and wherein the flexible material portion may be configured to suspend the means for windowing a display.

The means for supporting may be an apparatus cover.

BRIEF DESCRIPTION OF DRAWINGS

For a better understanding of the present application and as to how the same may be carried into effect, reference will now be made by way of example to the accompanying drawings in which.

DETAILED DESCRIPTION OF SOME EMBODIMENTS

The following describes apparatus and methods for loudspeaker or acoustic transducer configurations and package arrangement suitable for generating audio signals.

The concept with as embodied by the description herein is to provide a casing or cover for an electronic apparatus which is suitable for suspending a display or cover window part relative to another part of the apparatus and enabling the display (ox cover window) to move relative to the 'base' of the apparatus and therefore generate suitable audio and tactile outputs. Although display technologies have been mounted or suspended within a chassis arrangement within the apparatus these are typically complex arrangements and often produce poor "feel". In the embodiments described herein the casing or cover, both in the material properties and the shape of the casing can provide a suitable suspension mounting the moving display portion relative to a static portion of the apparatus.

Figure 1:
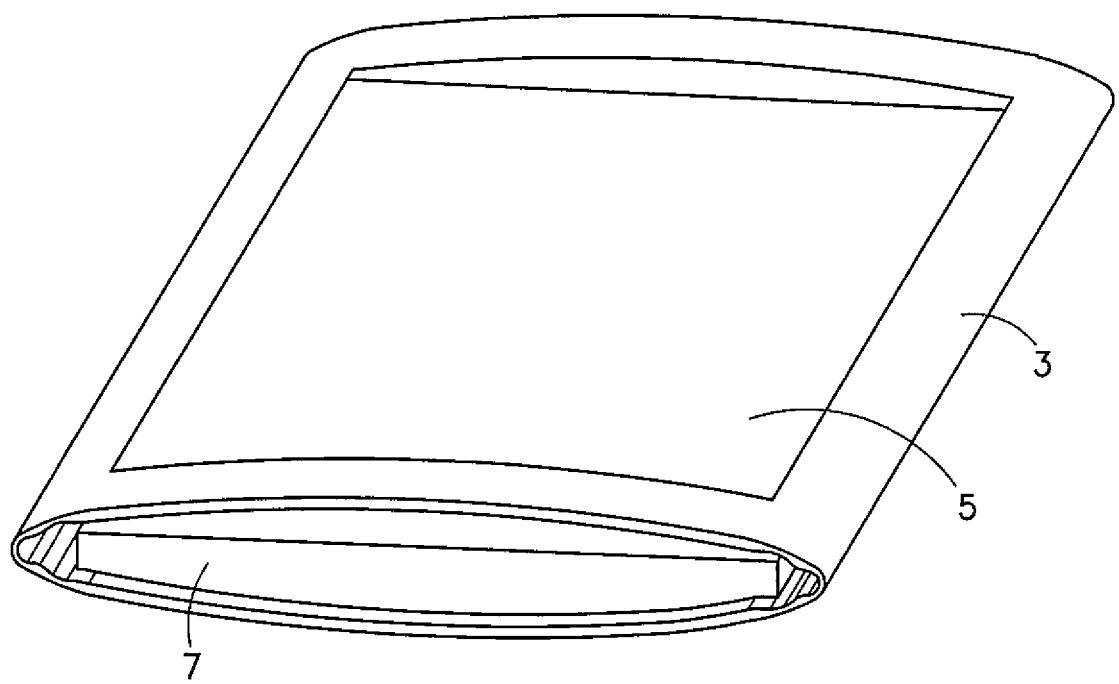
FIG. 1 illustrates a three dimensional end schematic view of an example display suspension implementation according to some embodiments.

FIG. 1 discloses a schematic representation of an electronic device or apparatus 1. The apparatus 1 in some embodiments can be a mobile phone, portable audio device, or other means for playing sound. The apparatus 1 is in some embodiments a mobile terminal or user equipment for operation in a wireless communication system.

In other embodiments, the apparatus 1 is any suitable electronic device configured to generate sound, such as for example a digital camera, a portable audio player (mp3 player or similar), a portable video player (mp4 player or similar) and a portable computer, for example a laptop PC. In some other embodiments the apparatus 1 can be any suitable audio or audio subsystem component or any suitable audio capture/audio rendering device In some embodiments, the apparatus 1 comprises a sound generating module which is linked to a processor. The processor can be configured to execute various program codes.

The implemented program codes in some embodiments can be stored for example in a memory within a program code section for retrieval by the processor whenever needed. The memory could further provide a section for storing data, for example data that has been processed in accordance with the embodiments. The code can, in some embodiments, be implemented at least partially in hardware or firmware.

The processor can be further linked to a transceiver (TX/RX), to a user interface (UI) and to a display 5. The user interface can enable a user to input commands or data to the apparatus 1. Any suitable input technology can be employed by the apparatus 1. It would be understood for example the apparatus in some embodiments could employ at least one of a keypad, keyboard, mouse, trackball, touch screen, joystick and wireless controller to provide inputs to the apparatus 1.

With respect to FIG. 1 a three dimensional view of an example display suspension implementation for a tactile audio display apparatus. In the example shown in FIG. 1 the suspension is provided at least partially by the casing.

The apparatus 1 in some embodiments comprises a casing 3 or cover configured to surround the electrical components 7 of the apparatus 1. In the following examples the suspension of the display is described with respect to the cover or casing 3, however it would be understood that in some embodiments the suspension can be achieved with respect to the body portion of the apparatus or some means for supporting the display.

The casing 3 or cover in some embodiments can as shown in FIG. 1 be in the shape of an extruded ellipse with the major axis defining a 'front' and 'rear' of the apparatus. In other words the cross sectional shape of the casing 3 is oval.

It would be understood and as shown with respect to FIGS. 6, 7, and 8a to 8h any suitable casing shape can be implemented with a suitable suspension hinge arrangement.

The casing 3 in some embodiments can have within the 'front' section a hole within which the display 5 is located. As shown in FIG. 1 the display 5 being substantially planar is configured to be substantially at the same level as the hole edges, in other words the central portion of the display 5 is recessed within the casing. However in some embodiments it would be understood that the display 5 can be located proud of the casing 3, in other words the display is approximately in line with the central line (minor axis) of the ellipse and therefore extends out of the hole at the periphery of the display 5. It would be understood that the 'height' of the display 5 relative to the casing 3 hole can be any suitable value.

In some embodiments the apparatus 1 comprises a display 5. The display can as described herein be a tactile audio display. A tactile audio display is a display capable of being driven by a suitable motor/transducer and vibrating so that it can generate acoustic waves and further provide localised tactile outputs. In some embodiments the display is a conventional touch screen display capable of being moved and moving in relation to the casing or a portion of the casing. The display as shown in the examples described herein comprises a window which protects the display but permits light to pass through, a display layer which can be any suitable display technology and configured to generate a display output which can be seen through the window and a touch sensitive layer which can be any touch sensitive technology and configured to determine touch (or approximate touch—such as hover touch) which can be used as an input.

In some embodiments the apparatus comprises 'static' internal components 7. The 'static' internal components 7 of the apparatus can for example be the electrical components such as the processor, memory, transceiver, transducers etc. Furthermore the internal components can be the support structures which locate and couple other components, such as those described above. For example the internal components 7 further comprise printed wiring board (PWB) and printed circuit boards (PCB). Furthermore the internal components further comprise any suitable power generation or storage device such as battery, fuel cell, hypercapacitor etc.

Figure 2:
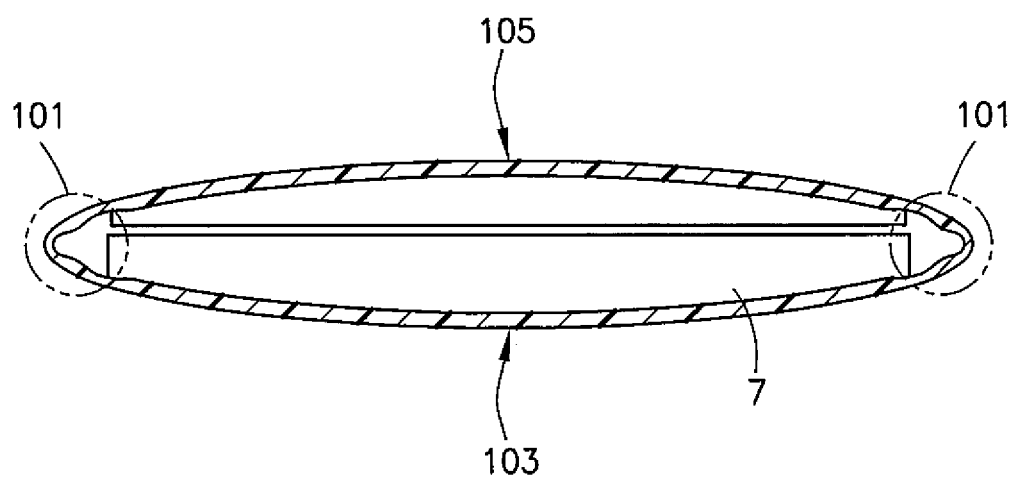
FIG. 2 shows a cross sectional view of the example display suspension shown in FIG. 1 according to some embodiments.

With respect to FIG. 2 a cross sectional view of the elliptical casing suspension example shown in FIG. 1 is shown.

The apparatus 1 is shown in the cross sectional view with the 'static' internal components 7 such as printed wiring board, battery, processors, etc. coupled to the internal side of the "rear" of the apparatus casing 3. The 'static' internal components 7 and the 'rear' of the apparatus casing 3 form a 'static' portion 103 or engine part of the apparatus.

The apparatus 1 further shows the display 5 coupled to the "front" of the apparatus casing 3 which forms a 'moving display' portion 105.

In other words the moving display portion 105 can be configured to move relative to the static portion 103.

Coupling the rear and the front parts of the casing 3 are the flexible areas or suspension 101.

Figure 3:
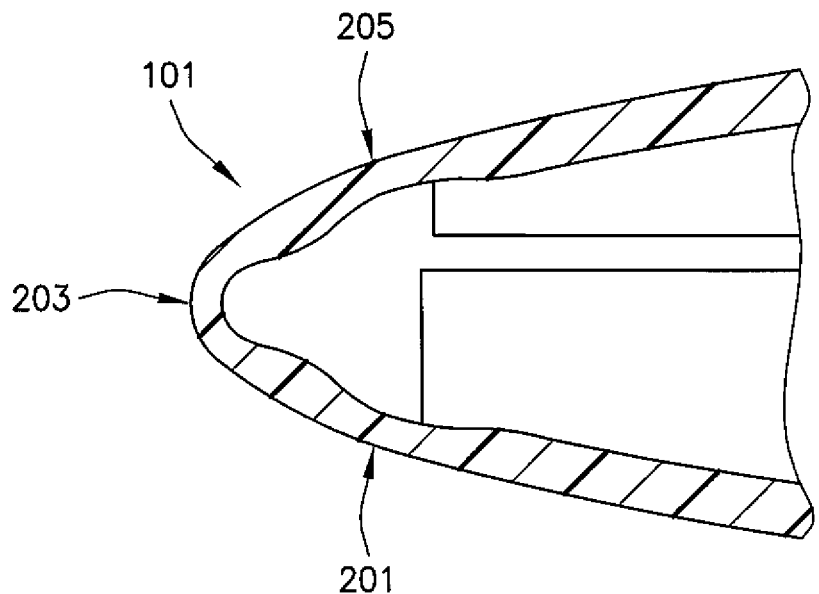
FIG. 3 shows a detailed view of the end portion of the example display suspension example shown in FIG. 2 according to some embodiments.

With respect to FIG. 3 a detailed view of the end portions or flexible areas of the casing 3 is shown. The end portions or flexible areas of the casing 3 in these embodiments form the main suspension for the apparatus.

The flexible areas or suspension portion 101 as shown in FIG. 3 comprises a casing thickness which varies. The varying casing thickness can be shown for example in FIG. 3 by the thinner regions or areas of the casing 201, 205 and 203 where the material is thinner than other sections or areas of the casing. These thinner regions produce localised regions of structural weakness which are able to bend or flex under pressure or action of a force relative to the normal thickness casing regions. Furthermore by the careful locating of the thinner regions at the relative ends or edges of the casing then force on one of the faces relative to the other face causes the ends or flexible areas to flex relative to the thicker or more rigid parts of the casings.

As can be seen in FIG. 3 the elliptical or oval shape where the flexible areas are located at the end of the 'faces' permits the moving display portion and engine part or static portion be rigid but move relative to each other. In other words the display can be connected or coupled firmly into a recess which forms a solid or rigid panel within the moving display portion 105.

This material forming the casing can be any material which is both very strong and flexible permitting the moving display portion 105 to move relative to the static portion 103. For example the material of the cover can be grilamid TR 90 UV.

Figure 4:
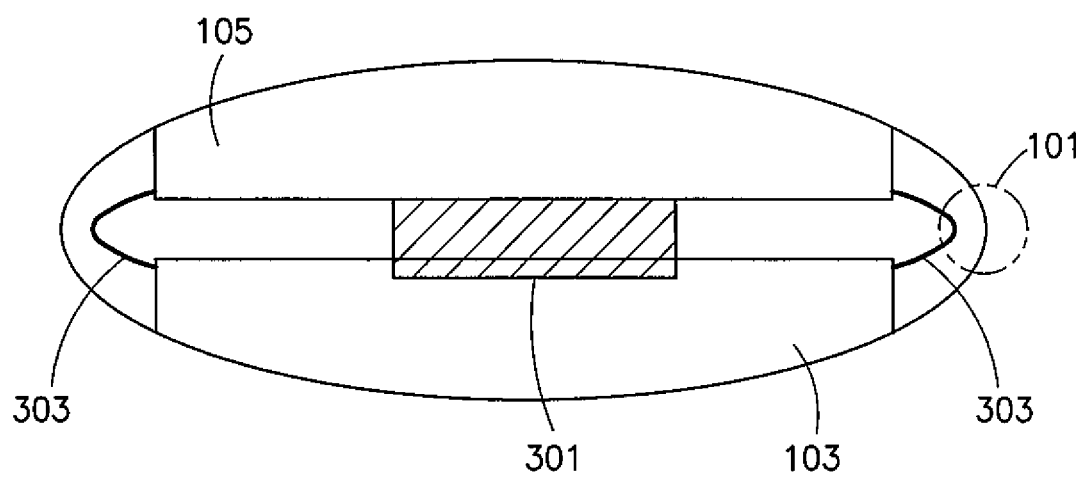
FIG. 4 shows a schematic view of the mechanical driving coupling and electrical coupling implementation implemented within the example display suspension according to some embodiments.

FIG. 4 shows a further view of the apparatus shown in FIGS. 1 to 3 shows the mechanical and electrical couplings between the moving display portion 105 and the static portion 103.

In some embodiments the moving display portion 105 is driven with respect to the static portion 103 by a motor or driver 301. The motor or driver 301 is configured to bridge a gap through the apparatus between the static portion 103 and the moving display portion 105 enabling the moving display portion 105 to move towards the static portion 103 without colliding or impacting with the static portion 103. The motor or driver 301 can in some embodiments be a piezo-electric transducer or a voice coil motor. The motor or driver 301 can in some embodiments be any number of transducer or motor elements distributed along the length of the apparatus and configured to be able to generate localised motion of the moving display portion 105 relative to the static portion 103.

Furthermore as shown in FIG. 4 the apparatus comprises an electrical flexible connection coupling the engine part or static portion 103 to the moving display portion 105. The electrical flexible connection 303 can provide suitable electrical connections to the moving display portion 105 from the electrical components within the static portion 103 and similarly provide a suitable output path from the touch screen to the processor on the static portion. The electrical flexible connection 303 can thus provide suitable signalling coupling and suitable power coupling between the touch and display components of the moving display portion 105 and the static portion 103.

In some embodiments the apparatus can further comprise a secondary or auxiliary suspension between the static portion 103 and the moving display portion 105. With respect to FIG. 5 examples of secondary suspension component implementations for some embodiments are shown. Within the casing 3 as shown in FIGS. 1 to 4 the engine part or static portion 103 is separated from the moving display portion 105 by a gap and coupled via the motor or driver 301 and furthermore the flexible areas 101 of the casing 3. However in some embodiments the moving display portion 105 can be flexibly coupled to the static portion 103 by a plug which has at least one flexible portion allowing the display portion to move relative to the static portion.

Figure 5:
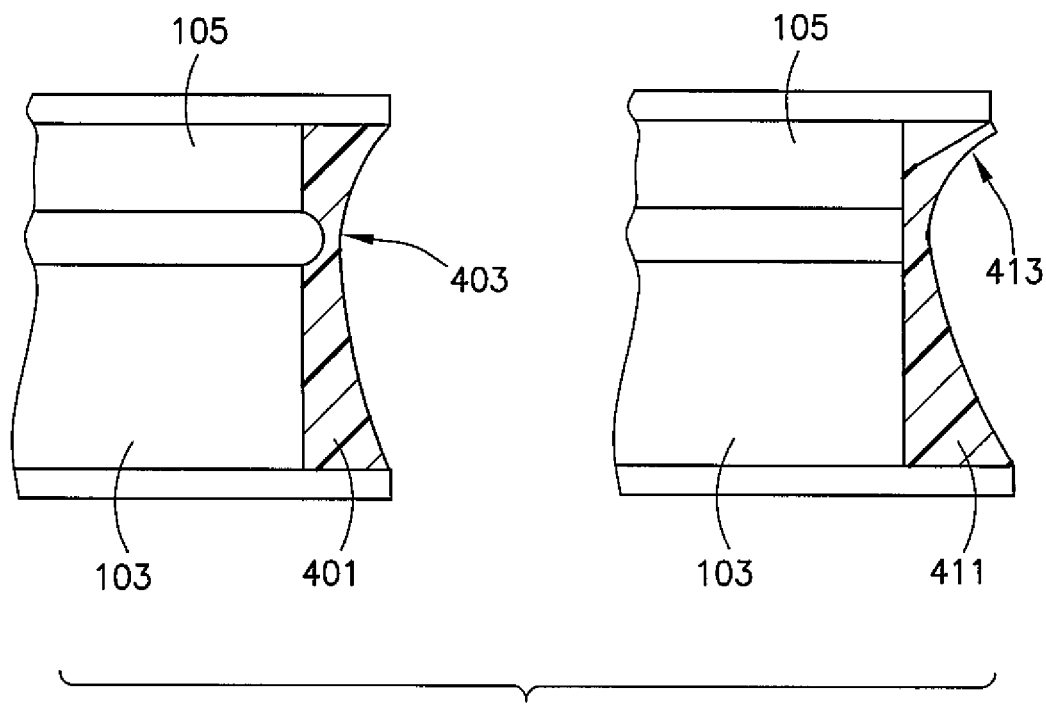
FIG. 5 shows schematic views of auxiliary or end plug suspension configurations according to some embodiments.

With respect to FIG. 5 two example implementations of the plug are shown. As seen on the left hand side of FIG. 5 a first flexible coupling forming a secondary suspension the elastic plug 401 comprises an elastomer connecting the two parts with the elastomer comprising a thinned or narrowed section 403 which flexes when pressure or force is applied to the moving display portion 105 relative to the static portion 103.

With respect to the right hand side of FIG. 5 a second flexible coupling is shown where an elastomer plug 411 coupled to the static portion is taller than the static portion with a flexible lip 413 which is coupled to the moving display portion 105. When pressure of force is applied to the moving display portion 105 the flexible lip 413 (which is thinner than the elastomer plug 411 average thickness) flexes and both suspends and dampens the movement of the moving display portion 105 relative to the static portion 103.

As discussed herein the casing or cover can be configured to perform the role of a suspension between a moving display portion and the remainder (or static portion) of the apparatus in forms other than the oval or elliptical form shown in FIGS. 1 to 4.

Figure 6:
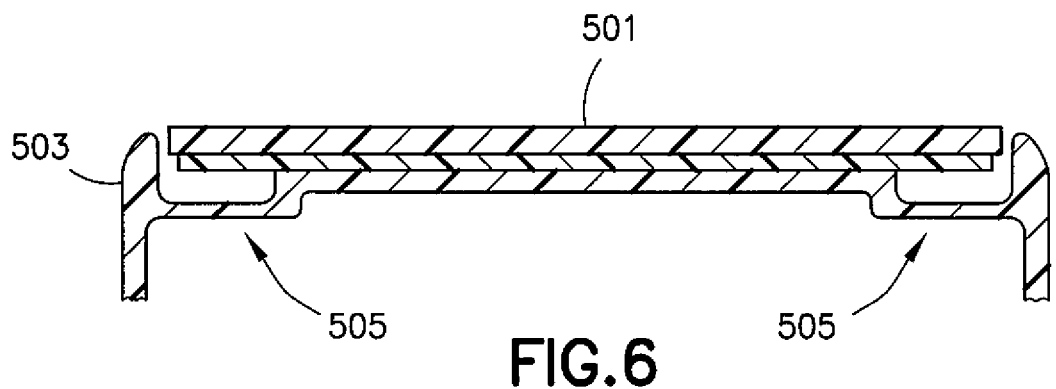
FIG. 6 shows an example "under" display suspension implementation according to some embodiments.

With respect to FIG. 6 a further example of a casing suspension is shown. In the example shown in FIG. 6 the upper part of the apparatus is shown with the casing or cover 503 is coupled to the window and display components 501 (the moving display portion) via flexible areas (suspension components) of the casing or cover which are located underneath the display.

The flexible areas 505 shown in FIG. 6 are narrowed or thinned portion of the casing operating as a flat or cantilevered spring hinged at the casing or cover and coupled at the other end to a portion of the casing coupled to the moving display portion (the window-display) 501. The operation of a force on the moving display portion 501 causes the narrowed casing section to flex and permits the motion of the moving display portion relative to the casing. In such examples the flexible area can surround the display and permit the apparatus to be fully sealed thus preventing foreign material from entering the apparatus.

Figure 7:
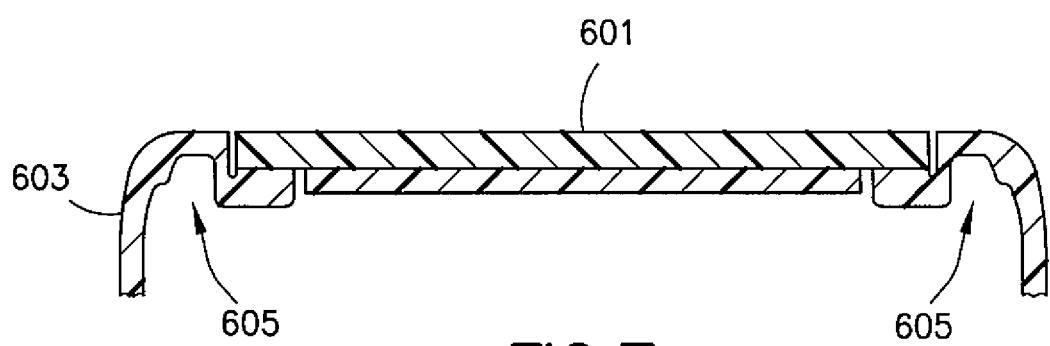
FIG. 7 shows an example "adjacent" display suspension implementation according to some embodiments.

With respect to FIG. 7 a further example of a casing (or cover) suspension implementation is shown. In the example shown in FIG. 7 the thinned or narrowed section 605 of the casing is located adjacent to the moving display portion. In other words the moving display portion (window+display 601) is coupled to the casing or cover 603 via flexible areas of cover which are surrounding or ringing the display. These adjacent flexible areas 605 can be considered to be flat or cantilevered springs hinged at the casing 603 corners or to the casing corners and with a 'free' end coupled to the moving display portion 601.

The location of the suspension components adjacent to the moving display portion can mean the package size is longer and wider (due to the hinging section dimensions) but produce a thinner package compared to the under display suspension components.

In the examples shown with respect to FIGS. 6 and 7 the suspension is provided by suspension components located adjacent to or beneath the face of the display portion it would be understood that in some embodiments the suspension can be provided by components or implementations using the 'vertical' walls, in other words the edges or sides between the front and rear faces of the apparatus.

Furthermore although the exampled described herein show the casing formed from a single material with the flexibility created by generating portions of the casing with lower structural rigidity (compared to the rest of the casing), it would be understood that in some embodiments the flexibility can be generated by using different materials with the determined rigid and flexible mechanical properties. For example the casing formed from a rigid material can be coupled to the display via a flexible elastomer part. The elastomer part thus provides a flexible member which flexes as pressure is applied relative to the remainder of the casing.

With respect to FIGS. 8a to 8h further examples of flexible case suspension implementations are shown.

Figure 8A:
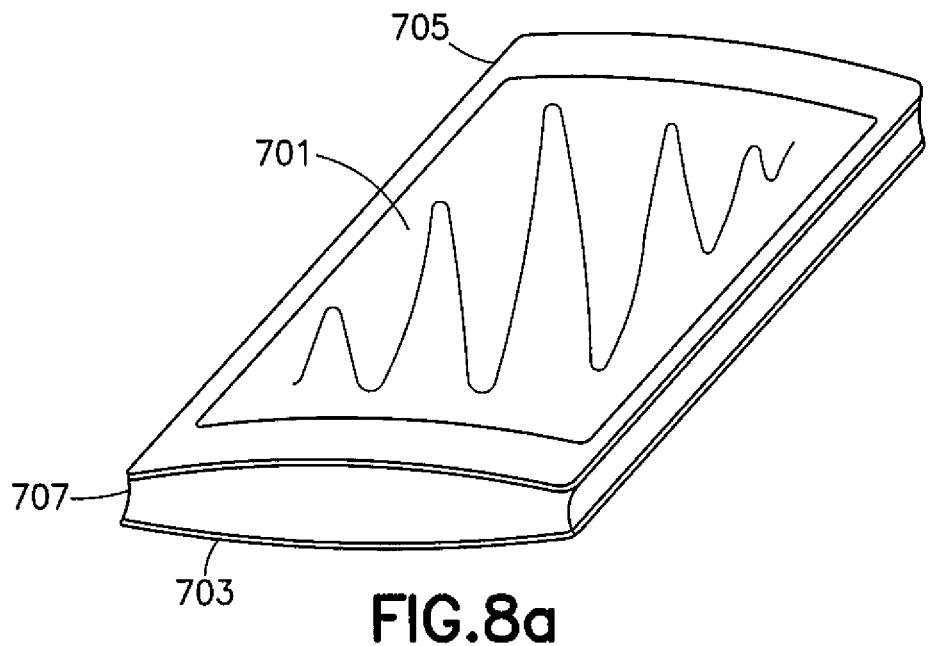
FIGS. 8a to 8h show schematic views of example "vertical wall" display suspension implementations according to some embodiments.

In FIG. 8a a three dimensional view of an example implementation is shown are where a front casing 705 (comprising or coupled to the display 701 and/or window) and rear casing 703 (comprising the static portion) are a rigid material which are coupled by a 'vertical wall' 707 or element formed from a softer material such as an elastomer.

In such embodiments the solid parts and elastomer parts are moulded together using a two shot moulding. They then form a solid part or assembly.

With respect to FIGS. 8b to 8h various possible vertical wall constructions according to some embodiments are shown.

Figure 8B:
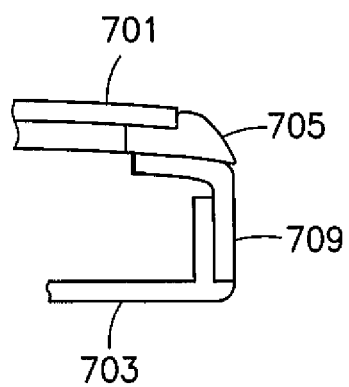

FIG. 8b for example shows a simple inverted-L section elastomer suspension spring 709 coupling (fixed to) the rear casing 703 along the inside of one of the arms of the inverted-L section and coupled to the outside of the other arm of the inverted-L section to the front casing 705 which supports the display and display window 701. In such embodiments the flexibility or bending of the elastomer under the weight or force of the front casing relative to the back casing section suspends the front casing relative to the back casing.

Figure 8C:
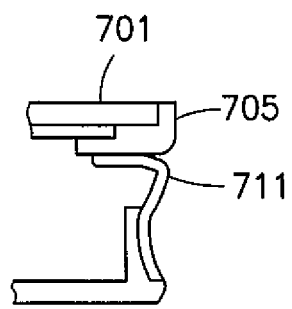

FIG. 8c shows a curved or modified inverted-L section elastomer suspension spring 711 which is configured to flex when a force is applied to the front casing 701 and so enable the movement of the display 701.

Figure 8D:
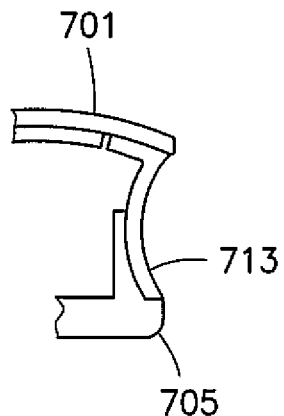

FIG. 8d shows a curved or modified inverted-L section elastomer suspension spring 713 coupled to the rear casing 705 by one arm and the other arm coupled directly to the display window portion 701. Such a design would for example by suitable for 'frame less' display apparatus.

Figure 8E:
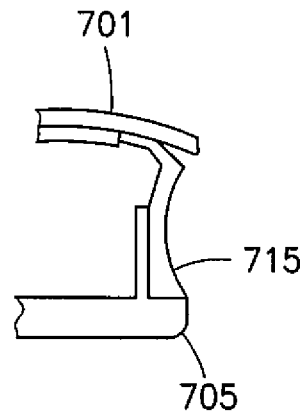

FIG. 8e shows a further elastomer spring with three hinges. The three hinge elastomer spring 715 is configured so that the hinges are counter orientated in the same plane permitting a concertina (collapsing and expanding) type movement when force is applied and therefore enabling a flexible 'vertical wall' construction permitting the display window portion 701 to move relative to the rear casing portion 705.

Figure 8F:
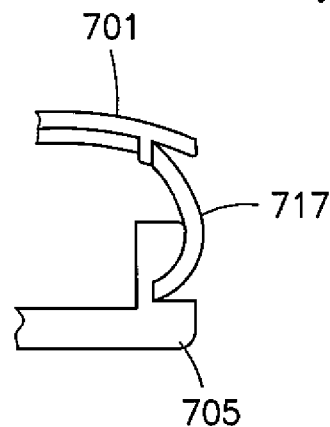

FIG. 8f shows a curved section elastomer spring 717 which is coupled at one section to the rear casing 705 and at the opposite curved section to the display window portion 701. The application of force to the display window portion 701 causes the curved section elastomer spring 717 to either straighten or become further curved relative to a 'at rest' curve and therefore suspend but permit the movement of the display window portion 701 relative to the rear casing 705.

Figure 8G:
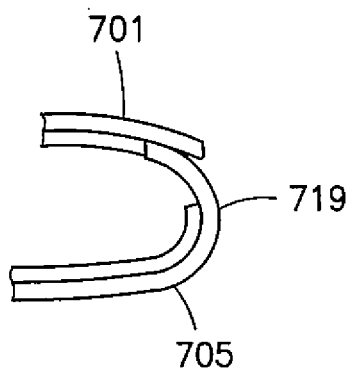

FIG. 8g the curved section elastomer spring 719 which forms the outermost layer of the rear casing 705. In other words the elastomer portion covers the rigid rear or static portion and could provide a more tactile grippier rear casing.

Figure 8H:
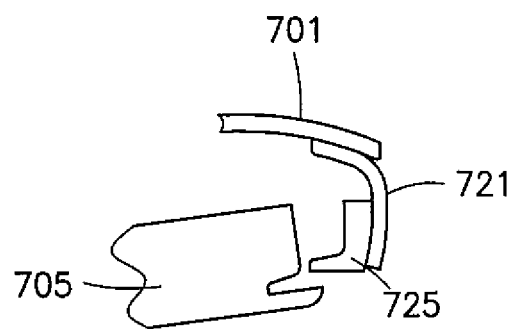

FIG. 8h shows a further inverted-L section elastomer suspension spring 721. The spring shown in FIG. 8h however is shown coupled with one arm to the display window 701 but coupled by the other arm to a retaining ring 725 which in turn fits into a suitable lip in the rear casing 705.

It would be understood that in some embodiments that the display configured to move relative to as static portion can, be the display or cover window portion which overlies the display components. In such embodiments the display components can be part of the static part of the apparatus. In such embodiments there can be implemented a flexible dust seal between the mobile display or cover window and the static display to prevent dust entering between the mobile and static portions.

Furthermore in some embodiments employing touch screen components the display or cover window can further overlie the touch sensor components. The touch sensors can in such embodiments further be part of the static part of the apparatus.

Figure 9:
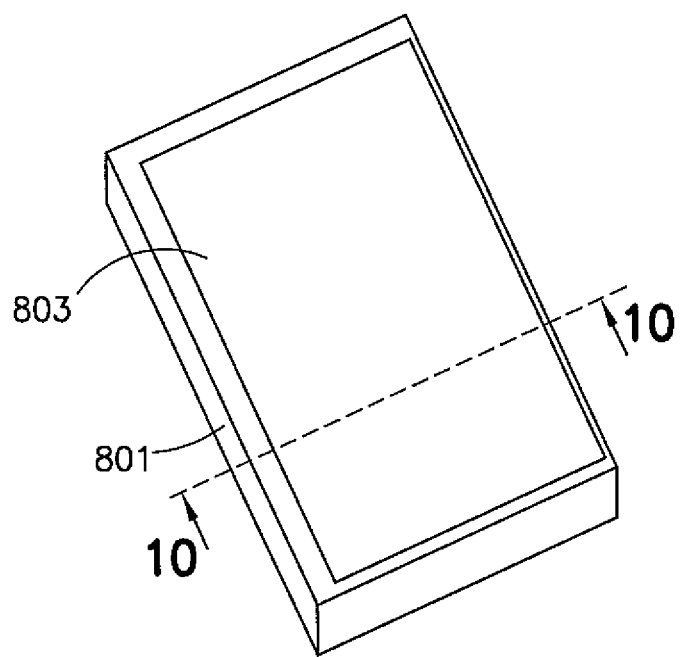
FIG. 9 shows a three dimensional end schematic view of a further example display window suspension implementation according to some embodiments.
Figure 10:
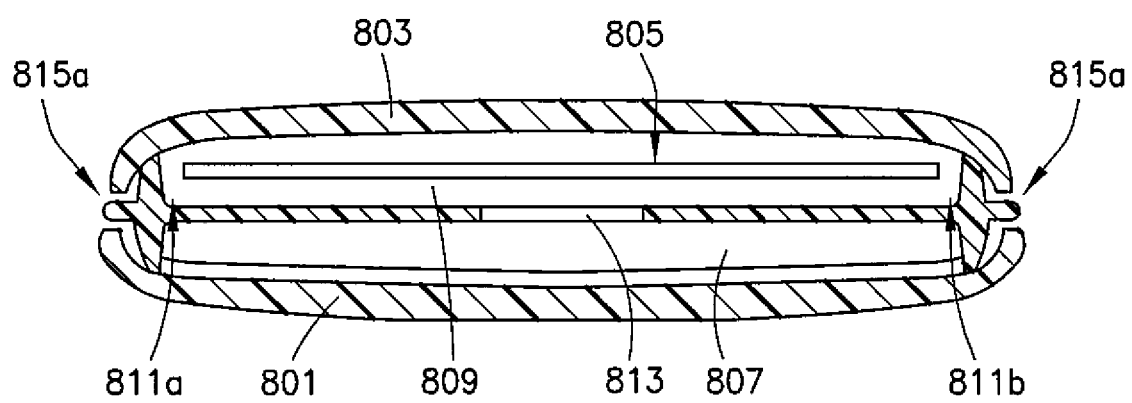
FIG. 10 shows a cross sectional view of the further example display window suspension shown in FIG. 9 according to some embodiments.

For example with respect to FIGS. 9 and 10 a further example of the electronic apparatus is shown wherein the display components are coupled to the static portion of the apparatus.

FIG. 9 for example shows a three dimensional projection of an example apparatus with static display. The elongated oval cross section of the apparatus comprises a casing or cover 801 with a hole or section within which is located the display window 803 (or display cover) through which the display can be viewed. The display window 803 as shown in FIG. 9 comprises a curved profile transparent material. In some embodiments the display window 803 and the cover 801 are separated by a physical flexible seal or area. The flexible seal may be provided with a breathing hole. The breathing hole may have a High-Efficiency Particulate Arresting (HEPA) filter to prevent the ingress of dust and other contaminants into the apparatus. In other embodiments, at least one breathing hole may be provided additionally or alternatively in a different location to the flexible seal. For example the at least one breathing hole may be provided by a connector hole. At least one breathing hole may be provided on at least one of the cover and the display window. A HEPA filter may again be provided.

FIG. 10 shows the cross-sectional view through the dashed line of the example apparatus shown in FIG. 9. As shown herein the curved profile of the cover 801 which forms a lower (or apparatus rear perimeter) surface and the curved profile of the display window 803 which forms the upper (or apparatus front perimeter) surface are separated by flexible window-cover couplings 815a, 815b. In the example shown herein the flexible window-cover couplings are flexible bellow couplings (one shown at each side). In some embodiments the couplings are airtight, however in some embodiments the couplings are air-permeable but are designed to be dust and particulate impermeable so to allow the pressure within the apparatus to stabilize but without allowing dust and particles to damage the interior of the apparatus. It would be understood that in some embodiments the display window 803 can be a flat or substantially flat or planar structure. Furthermore in some embodiments there window can be bordered by a 'front' cover portion which acts as a display periphery and in such embodiments the 'front' cover portion would couple to the 'rear' cover portion via a flexible coupling.

In the example shown below, directly underneath the display window is the display component 805. The display component can as described herein be any suitable display technology, passive or active. In FIG. 10 the cross-sectional view provides the appearance that the display component 805 is floating, however it would be understood that the display component 805 is coupled to the static portion 807 at a point other than that shown in the cross-sectional view, for example at locations where there is no actuator 809, or at the ends of the apparatus. The display component 805 is thus static compared to the display window 803.

FIG. 10 shows the static portion 807 of the apparatus located to the rear of the apparatus and can be coupled to the interior side of the cover 801. As described herein the static portion 807 can comprise the inner hardware such as the battery and printed wiring board. Furthermore the static portion 807 can be coupled to an actuator 809 via an actuator/static coupling 813 configured to provide a mechanical and electrical coupling between the static portion 807 and the actuator 809.

The actuator 809, which is shown in FIG. 10 as a piezo-electric actuator can be configured to be driven by signals from the static portion and move or drive the ends of the actuator 809. This movement can then be transmitted to the display window 803 from the actuator 809 by at least one actuator/window coupling. In the example shown in FIG. 10 each end of the actuator is coupled to an actuator/window coupling 811a, 811b which is coupled to each side of the curved portion of the display window 803 via a right angled coupling rod or right angled bracket. It would be understood that the actuator/window coupling 811a, 811b can be any suitable shaped coupling. Furthermore in some embodiments the actuator 809 can be directly coupled to the display window 803. For example the actuator 809 could in some embodiments be coupled directly to the inside face of the curved portion of the window. In some embodiments the actuator/window coupling 811a, 811b is a actuator carrier on which the actuator is located and acts on, the flexibility of the carrier being transmitted to the display window causing the display window 803 to move relative to the static portion 807 and the cover 801.

In the examples such as' shown in FIGS. 9 and 10, the gap between the piezoelectric actuator and the static display component 805 can be approximately the same as the gap between the static and dynamic portions.

In embodiments such as described with respect to FIGS. 9 and 10, the advantages of implementing a static display are that there can be significantly fewer flexible electrical couplings between the display and the static portion. Furthermore in such embodiments the dynamic portion can be lighter leading to less dampening of the actuator force and therefore a higher efficiency between the actuator and acoustic wave or tactile signal generation. Furthermore by implementing a static display over a dynamic display window can in some embodiments have further advantages in that damage to the device due to falls or drops could result in lower repair costs as the display window absorbs the collision energy if hitting the surface rather than the bonded display and display window absorbing the collision energy.

In some embodiments the display window 803 can comprise the touch sensor components and the apparatus would be configured to determine 'hover' touch conditions as the point of contact would be on the display window separated from the display.

Figure 11:
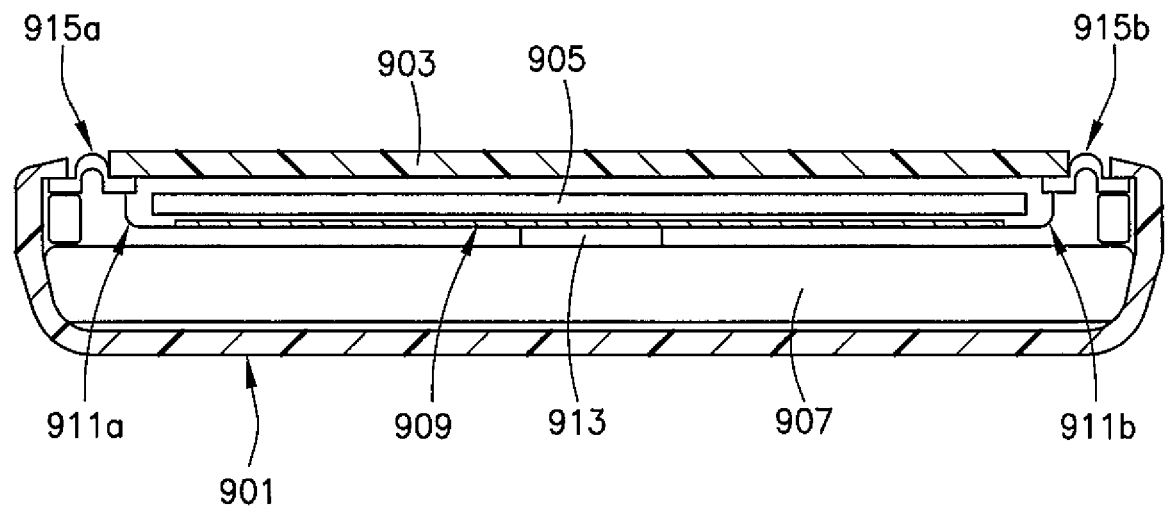
FIG. 11 shows a cross sectional view of the further example display window suspension according to some embodiments.
Figure 12:
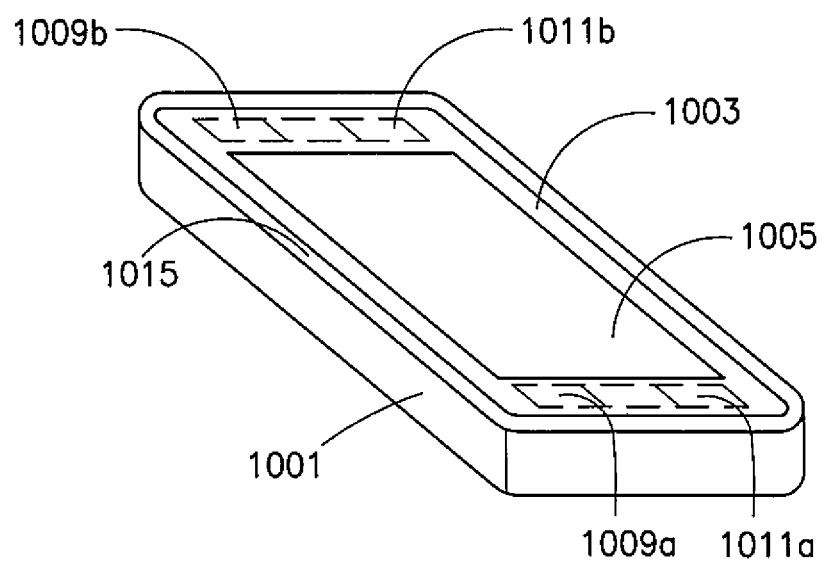
FIG. 12 shows a three dimensional end schematic view of the further example display window suspension implementation shown in FIG. 11 according to some embodiments.

With respect to FIGS. 11 and 12, a further example of electronic apparatus is shown wherein the display components are coupled to the static portion of the apparatus. However this example differs from the example shown in FIGS. 9 and 10, as the example shown with respect to FIGS. 11 and 12 has a substantially flat or planar display window and furthermore the flexible window/cover coupling is implemented as an adjacent coupling.

As shown in FIG. 11, the cross sectional view of the example apparatus, the casing or cover 901 is a box or casing with a hole or section removed on the 'front' face within which is located the display window 903 (or display cover) through which the display can be viewed. The display window 903 as shown in FIG. 11 comprises a flat or planar (or substantially flat/planar) transparent material. In some embodiments the display window 903 and the cover 901 are coupled by a physical flexible seal 915 surrounding the display window 903 and shown in FIG. 11 by the flexible bellows material (window/cover coupling) shown on the left-hand side 915a and, the right-hand side 915b of the cross sectional view. In some embodiments the flexible seal 915 may be provided with a breathing hole. The breathing hole may have a High-Efficiency Particulate Arresting (HEPA) filter to prevent the ingress of dust and other contaminants into the apparatus. In other embodiments, at least one breathing hole may be provided additionally or alternatively in a different location to the flexible seal. For example the at least one breathing hole may be provided by a connector hole. At least one breathing hole may be provided on at least one of the cover and the display window. A HEPA filter may again be provided.

The apparatus as shown in FIG. 11 comprises an actuator/window coupling 911a (left hand side) and 911b (right hand side) coupling the display window 903 (via ends of the flexible bellow 915) to the ends of the actuator 909. The actuator 909, shown as a piezo-electric actuator, can be configured to be driven by signals from the static portion 907 and move or drive the ends of the actuator 909. This movement can then be transmitted to the display window 903 by the at least one actuator/window coupling 911. The actuator 909 can at the central region be coupled to the static portion 907 via an actuator/static coupling 913. Furthermore the static portion 907, such as the inner hardware, battery, printed wiring board of the apparatus can be located within the cover 901. The display component 905 can in some embodiments be any suitable display technology and be coupled to the static portion 907.

With respect to FIG. 12 a three-dimensional view of the example apparatus with substantially planar or flat display window shown in FIG. 11 is shown. A described herein the cover 1001 has a front window or hole within which the flexible bellow or window/cover coupling 1015 surrounds the display window 1003. The display window 1003 is coupled via the actuator/window coupling shown in FIG. 12 by the end couplings 1011a and 1011b coupling a first actuator 1009a and a second actuator 1009b located towards the ends of the display window 1003. The actuator 1009a and 1009b are further coupled to the static portion 1007 at the central region of the actuator. The display 1005 also coupled to the static portion 1007 can be seen through the display window 1003. Although in the example shown in FIG. 12 the actuators are located at or towards the ends of the display portion it would be understood that the actuators could be located at any suitable position.

Figure 13:
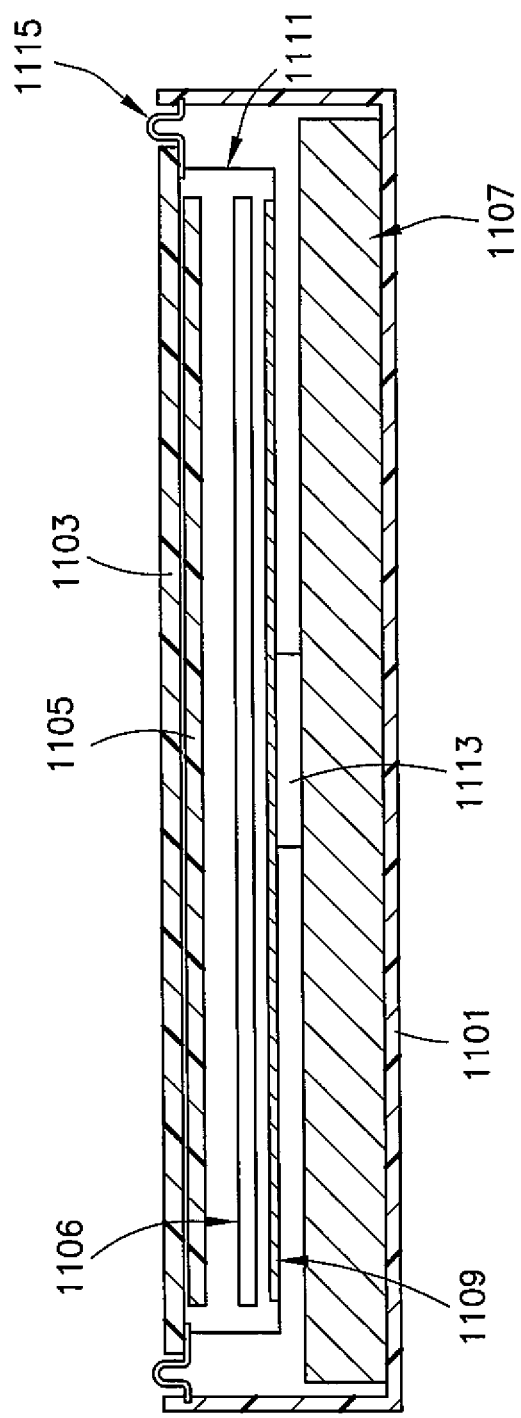
FIG. 13 shows a cross sectional view of a further example display assembly suspension according to some embodiments.

With respect to FIG. 13 a cross-sectional view of a further example of a partial suspended display is shown. In the example shown in FIG. 13 the cover 1101 is coupled to the display window 1103 by a flexible window/cover coupling 1115. Within the cover 1101 is located the static portion 1107. Furthermore the static portion 1107 is coupled to the actuator(s) 1109 by the actuator/static coupling 1113. The actuator 1009, which in this example is a piezo-electric actuator, is coupled at the ends to the display window 1103 via at least one actuator/window coupling 1111.

In the example shown in FIG. 13 the display components are separated such that the display, which in the example shown in FIG. 13 is a liquid crystal display (LCD) comprises a LCD backlight component 1106 which is static and coupled to the static portion 1107 (not shown) and a liquid crystal display glass panel with front and back polarisers 1105 which is coupled to the display window 1103 and is thus dynamic or moving due to the force applied by the actuator on the display window 1103. It would be understood that in some embodiments the display window can incorporate the touch sensor or 'touch screen' sensor element. In such embodiments the LCD back light is separated from the glass panel as typically the LCD back light has many layers which may cause rattling if implemented within the dynamic layer. It would be appreciated that the backlight could be any suitable lighting implementation.

It would be understood that the cover portion may be configured to suspend the display assembly such that the display assembly is configured to move in a direction substantially perpendicular to the display assembly. In other words in an 'up-down' motion relative to the 'front face' of the apparatus.

It shall be appreciated that the term portable apparatus is user equipment. The user equipment is intended to cover any suitable type of wireless user equipment, such as mobile telephones, portable data processing apparatus or portable web browsers. Furthermore, it will be understood that the term acoustic sound channels is intended to cover sound outlets, channels and cavities, and that such sound channels may be formed integrally with the transducer, or as part of the mechanical integration of the transducer with the apparatus.

In general, the various embodiments may be implemented in hardware or special purpose circuits, software, logic or any combination thereof. Some aspects of the application may be implemented in hardware, while other aspects may be implemented in firmware or software which may be executed by a controller, microprocessor or other computing apparatus, although the application is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing apparatus, or some combination thereof.

The embodiments of this application may be implemented by computer software executable by a data processor of the mobile apparatus, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the applications may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this application. However, various modifications and adaptations may become apparent to those skilled in the relevant arts in view of the foregoing description, when read in conjunction with the accompanying drawings and the appended claims. However, all such and similar modifications of the teachings of this application will still fall within the scope of this application as defined in the appended claims. Indeed there is a further embodiment comprising a combination of one or more of any of the other embodiments previously discussed.

What is claimed is:

1. An apparatus, comprising:
a body portion having at least a first wall section providing a casing to surround electrical components and being configured to have a lower structural rigidity compared to a remainder of the body portion; and
a display assembly coupled to the body portion, the display assembly comprising at least one of a display and a display window;
wherein the first wall section comprises a first thinned portion configured to suspend the display assembly at a thicker portion of the first wall section and a second thinned portion at an outer edge of the first wall section, the second thinned portion being configured to flex and allow movement of the display assembly upon application of a force from at least one actuator to the display assembly;
wherein the first wall section is coupled to the display assembly; and
wherein the body portion together with the first wall section form the casing configured to surround electrical components of the apparatus, the first wall section being configured to bend or flex relative to the remainder of the body portion upon application of the force to the display assembly.

2. The apparatus as claimed in claim 1, wherein the body portion further comprises a static portion coupled to the first wall section.

3. The apparatus as claimed in claim 2, further comprising an internal static portion comprising at least one of a battery, a printed wiring board, a printed circuit board, and a chassis coupled to the static portion.

4. The apparatus as claimed in claim 3, further comprising the at least one actuator on the static portion and coupled to the display assembly, wherein the at least one actuator is configured to apply the force to the display assembly relative to the static portion to enable the display assembly to move relative to the internal static portion.

5. The apparatus as claimed in claim 3, comprising a display coupled to the internal static portion and located separate from and underneath a display window.

6. The apparatus as claimed in claim 3, comprising a touch sensor coupled to the internal static portion and located separate from and underneath the display assembly.

7. The apparatus as claimed in claim 1, wherein the first wall section of the body portion is configured to suspend the display assembly such that the display assembly is configured to move in a direction substantially perpendicular to the display assembly.

8. The apparatus as claimed in claim 1, wherein the body portion proximate the display assembly comprises a flexible material portion and a portion of the body portion distal from the display assembly comprises a rigid material portion, wherein the flexible material portion is configured to flex relative to the rigid material portion, and wherein the flexible material portion is configured to suspend the display assembly.

9. The apparatus as claimed in claim 8, wherein the flexible material portion comprises at least one of a flexible material coupling the display assembly and the rigid material portion, an elastomer plug material coupling the display assembly and the rigid material portion, and an elastomer lip material coupling the display assembly and the rigid material portion.

10. The apparatus as claimed in claim 1, wherein the apparatus is an acoustic transducer.

11. The apparatus as claimed in claim 1, wherein a portion of the body portion is located adjacent to the display assembly.

12. The apparatus as claimed in claim 1, wherein a second wall section of the body portion is configured to suspend the display assembly.

13. The apparatus as claimed in claim 12, wherein at least one of the first wall section and the second wall section each comprise at least one of the first thinned portion adjacent the display assembly, the first thinned portion underneath and supporting the display assembly, and a curved profile body edge thinned wall section.

14. The apparatus as claimed in claim 1, further comprising a touch sensor coupled to the display assembly, wherein the body portion is configured to suspend the touch sensor.

15. An apparatus comprising:

a body portion comprising a vertical flexible wall providing a portion of a casing configured to surround electrical components of the apparatus, the flexible wall mechanically coupling a front surface and a rear surface of the apparatus and having a lower structural rigidity than a remainder of the body portion;

wherein the front surface comprises a display assembly, the display assembly comprising at least one of a display and a display window configured to be actuated by at least one actuator;

wherein the flexible wall extends underneath a portion of the display assembly and is configured to suspend the display assembly when a force is applied;

wherein the flexible wall has a thickness that is less than a thickness of the surface extending underneath the portion of the display assembly; and wherein the flexible wall is configured to flex and allow movement of the display assembly upon application of the force from the at least one actuator to the display assembly.

16. The apparatus as claimed in claim 15, wherein the body portion further comprises a static portion coupled to the flexible wall.

17. The apparatus as claimed in claim 16, further comprising an internal static portion comprising at least one of a battery, a printed wiring board, a printed circuit board, and a chassis coupled to the static portion.

18. The apparatus as claimed in claim 16, further comprising the at least one actuator on the static portion and coupled to the display assembly, wherein the at least one actuator is configured to apply the force to the display assembly relative to the static portion to enable the display assembly to move relative to the static portion.

19. The apparatus as claimed in claim 15, wherein the flexible wall of the body portion comprises an elastomer configured to suspend the display assembly.

20. The apparatus as claimed in claim 15, wherein the apparatus is an acoustic transducer.

* * * * *